US010336326B2

(12) United States Patent
Gurghian et al.

(10) Patent No.: US 10,336,326 B2
(45) Date of Patent: Jul. 2, 2019

(54) LANE DETECTION SYSTEMS AND METHODS (71) Applicant: Ford Global Technologies, LLC, Dearborn, MI (US)

(72) Inventors: Alexandru Mihai Gurghian, Palo Alto, CA (US); Tejaswi Koduri, Palo Alto, CA (US); Vidya Nariyambut Murali, Sunnyvale, CA (US); Kyle J Carey, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 211 days.

(21) Appl. No.: 15/362,521

(22) Filed: Nov. 28, 2016

(65) Prior Publication Data

US 2017/0369057 A1 Dec. 28, 2017

Related U.S. Application Data (60) Provisional application No. 62/354,583, filed on Jun. 24, 2016.

(51) Int. Cl.
*B60W 30/12* (2006.01)
*G08G 1/16* (2006.01)
(Continued)

(52) U.S. Cl.
CPC ......... *B60W 30/12* (2013.01); *G06K 9/00798* (2013.01); *G06K 9/66* (2013.01); *G06N 3/08* (2013.01); *G08G 1/167* (2013.01); *B60R 2300/30* (2013.01); *B60R 2300/303* (2013.01); *B60R 2300/304* (2013.01); *B60R 2300/607* (2013.01); *B60R 2300/804* (2013.01); *B60W 2420/42* (2013.01); *B60W 2720/24* (2013.01); *G06T 3/0093* (2013.01)

(58) Field of Classification Search
CPC ............ B60W 30/12; B60W 2420/42; B60W 2720/24; G06N 3/08; G06K 9/00798; G06K 9/66; B60R 2300/607; B60R 2300/303; B60R 2300/804; B60R 2300/30; B60R 2300/70; B60R 2300/304; G08G 1/167; G06T 3/0093; G06T 3/4038; G06T 3/00
See application file for complete search history.

(56) References Cited

U.S. PATENT DOCUMENTS 9,081,385 B1 7/2015 Ferguson
9,286,524 B1 3/2016 Mei
9,352,689 B2 5/2016 Kim
(Continued)

FOREIGN PATENT DOCUMENTS

CN 105426861 A 3/2016
JP 2008034981 A 2/2008
WO WO-2015099465 A1 7/2015

*Primary Examiner* — Jason Holloway
(74) *Attorney, Agent, or Firm* — David R. Stevens; Stevens Law Group (57) ABSTRACT Example lane detection systems and methods are described. In one implementation, a method received an image from-facing vehicle camera and applies a geometric transformation to the image to create a birds-eye view of the image. The method analyzes the birds-eye view of the image using a neural network, which was previously trained using side-facing vehicl camera images, to determine a lane position associated with the birds-eye view of the image.

18 Claims, 8 Drawing Sheets

US 10,336,326 B2
Page 2

(51) Int. Cl.
  *G06K 9/00* (2006.01)
  *G06K 9/66* (2006.01)
  *G06N 3/08* (2006.01)
  *G06T 3/00* (2006.01)

(56) References Cited

U.S. PATENT DOCUMENTS

| | | | | |
|---|---|---|---|---|
| 2007/0021915 A1* | 1/2007 | Breed | B60N 2/2863 | 701/301 |
| 2008/0119993 A1* | 5/2008 | Breed | B60R 19/205 | 701/46 |
| 2009/0187321 A1* | 7/2009 | Otsuka | B60R 21/0134 | 701/70 |
| 2009/0268027 A1* | 10/2009 | Yang | B60R 1/00 | 348/148 |
| 2010/0321211 A1* | 12/2010 | Ko | G08G 1/163 | 340/932.2 |
| 2011/0166782 A1* | 7/2011 | Watanabe | B60R 1/00 | 701/532 |
| 2011/0169957 A1* | 7/2011 | Bartz | B60R 1/00 | 348/149 |
| 2011/0181723 A1* | 7/2011 | Yamamoto | H04N 7/181 | 348/148 |
| 2011/0228088 A1* | 9/2011 | Gloger | B60R 1/00 | 348/148 |
| 2011/0234761 A1* | 9/2011 | Yumiba | B60R 1/00 | 348/46 |
| 2011/0310245 A1* | 12/2011 | Tsuchiya | G01S 11/12 | 348/135 |
| 2011/0317014 A1* | 12/2011 | Onaka | B60R 1/00 | 348/148 |
| 2014/0347469 A1* | 11/2014 | Zhang | B60R 1/00 | 348/118 |
| 2015/0161454 A1* | 6/2015 | Han | G06K 9/00798 | 382/104 |

* cited by examiner

LANE DETECTION SYSTEMS AND METHODS

RELATED APPLICATIONS

This application claims the priority benefit of U.S. Provisional Application Ser. No. 62/354,583, entitled "Deep Learning Based Front-Facing Camera Lane Detection", filed Jun. 24, 2016, the disclosure of which is incorporated by reference herein in its entirety.

TECHNICAL FIELD

The present disclosure relates to vehicular systems and, more particularly, to systems and methods that detect a vehicle's lane position in a roadway.

BACKGROUND

Automobiles and other vehicles provide a significant portion of transportation for commercial, government, and private entities. Vehicles typically include multiple sensors and algorithms that interpret sensor data to provide, enable, or otherwise support functionalities such as driver assistance, controlling vehicle dynamics, and autonomous driving. In particular, algorithms for detecting lane boundaries and determining a vehicle's position within a lane are important to safe operation of the vehicle.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Figure 1:
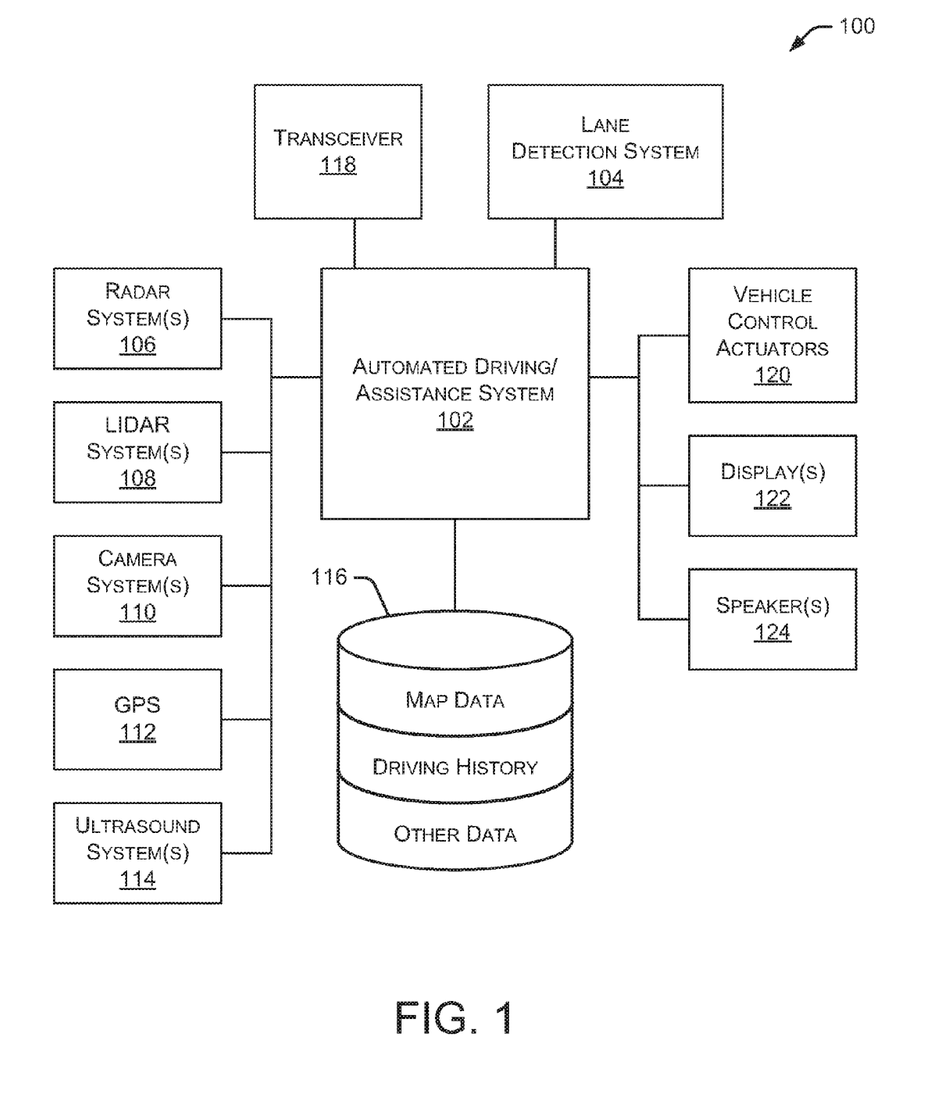
FIG. 1 is a block diagram illustrating an embodiment of a vehicle control system that includes a lane detection system.

FIG. 1 is a block diagram illustrating an embodiment of a vehicle control system 100 that includes a lane detection system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes lane detection system 104 that interacts with various components in the vehicle control system to identify roadway lane markings and determine a vehicle's position within a particular lane. In one embodiment, lane detection system 104 detects lane markings on the sides of one or more driving lanes and determines whether the vehicle's position within the lane should be adjusted (e.g., the vehicle is not centered within the lane or is straddling multiple lanes). Although lane detection system 104 is shown as a separate component in FIG. 1, in alternate embodiments, lane detection system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle within the lane markings associated with a driving lane on a roadway. The sensor systems/devices 106-110 and 114 may be used to obtain real-time sensor data so that the automated driving/assistance system 102 can assist a driver or drive a vehicle in real-time.

Figure 2:
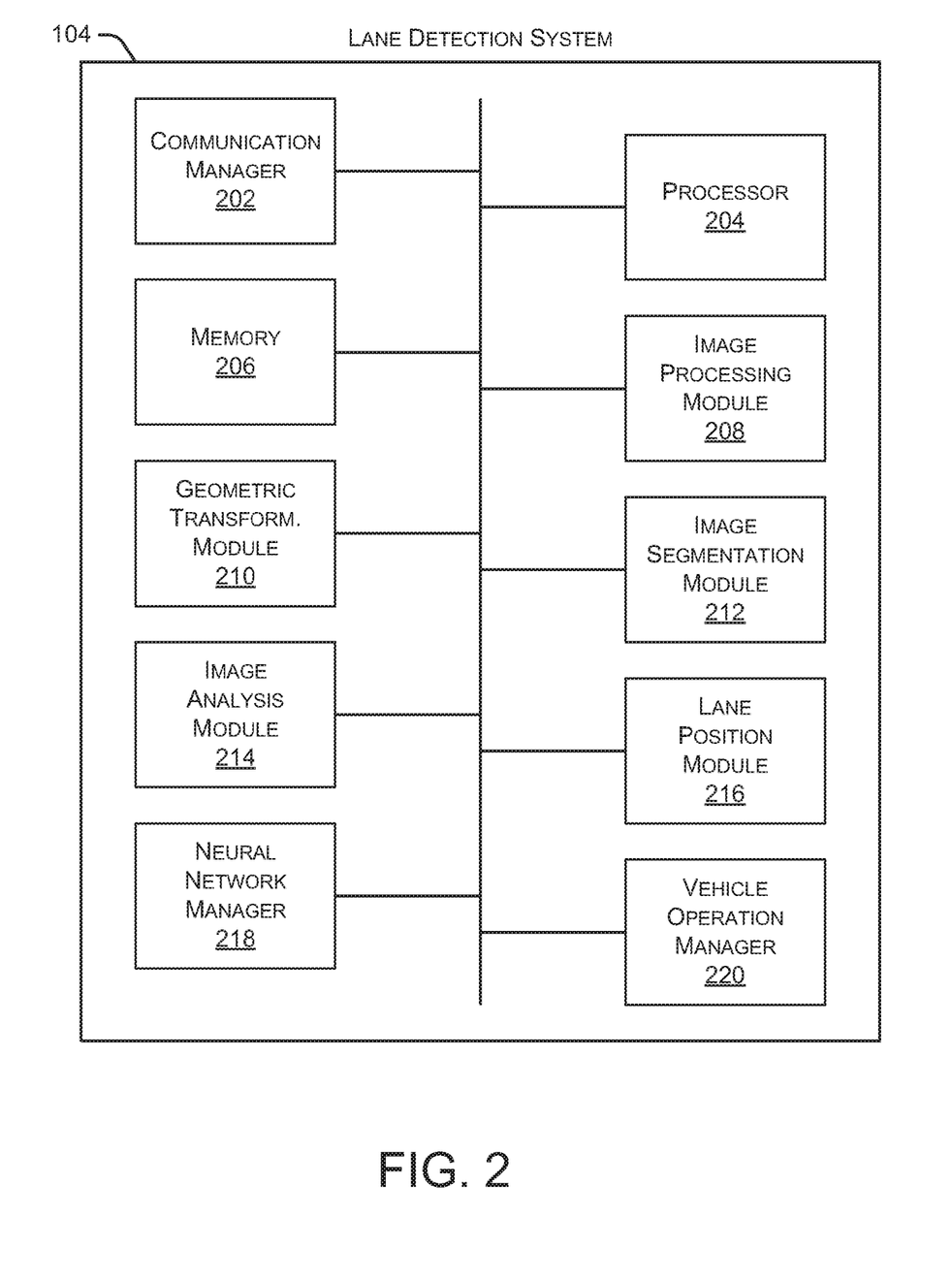
FIG. 2 is a block diagram illustrating an embodiment of a lane detection system.

FIG. 2 is a block diagram illustrating an embodiment of lane detection system 104. As shown in FIG. 2, lane detection system 104 includes a communication manager 202, a processor 204, and a memory 206. Communication manager 202 allows lane detection system 104 to communicate with other systems, such as automated driving/assistance system 102. Processor 204 executes various instructions to implement the functionality provided by lane detection system 104 as discussed herein. Memory 206 stores these instructions as well as other data used by processor 204 and other modules and components contained in lane detection system 104.

Additionally, lane detection system 104 includes an image processing module 208 that receives image data from one or more camera systems 110 and identifies, for example, lane markings on a roadway surface (e.g., painted lines, temporary markings (such as tape), and the like). In some embodiments, image processing module 208 includes a lane detection algorithm (or lane marking detection algorithm) that identifies lanes and lane markings on a roadway. In some embodiments, image processing module 208 receives images from a front-facing camera mounted to a vehicle.

A geometric transformation module 210 receives images from a vehicle-mounted camera, such as a front-facing camera mounted to a vehicle, and transforms the front-facing image to a birds-eye view image. As discussed herein, this geometric transformation is performed, for example, by transforming the image from one plane to another, such as from a vertical plane (created by the front-facing camera) to a horizontal plane (representing the planar surface of the roadway). Additionally, an image segmentation module 212 separates images into multiple segments for analysis and processing. In some embodiments, image segmentation module 212 separates a birds-eye view image into multiple segments, and each segment is analyzed to determine lane boundary markings located within the segment. An image analysis module 214 analyzes images to detect lane boundary markings. In some embodiments, image analysis module 214 analyzes multiple segments of a birds-eye view image, as discussed herein.

Lane detection system 104 also includes a lane position module 216 that determines a vehicle's position within a lane based on the vehicle's location with respect to lane boundary markings detected by the lane detection system. A neural network manager 218 manages access to neural network data used to process images, as discussed herein. A vehicle operation manager 220 manages the operation of a vehicle based on detection of a vehicle's position within a lane. For example, if a vehicle is not properly positioned within a lane, vehicle operation manager 220 may generate an audible, visual, or haptic warning to the driver of the vehicle to position the vehicle properly within the lane. The warning may include steering instructions, such as "steer to the right to stay within your lane." In some embodiments, if a vehicle is not properly positioned within a lane, vehicle operation manager 220 may instruct automated driving/assistance system 102 to automatically steer the vehicle to properly position the vehicle within the lane.

Figure 3:
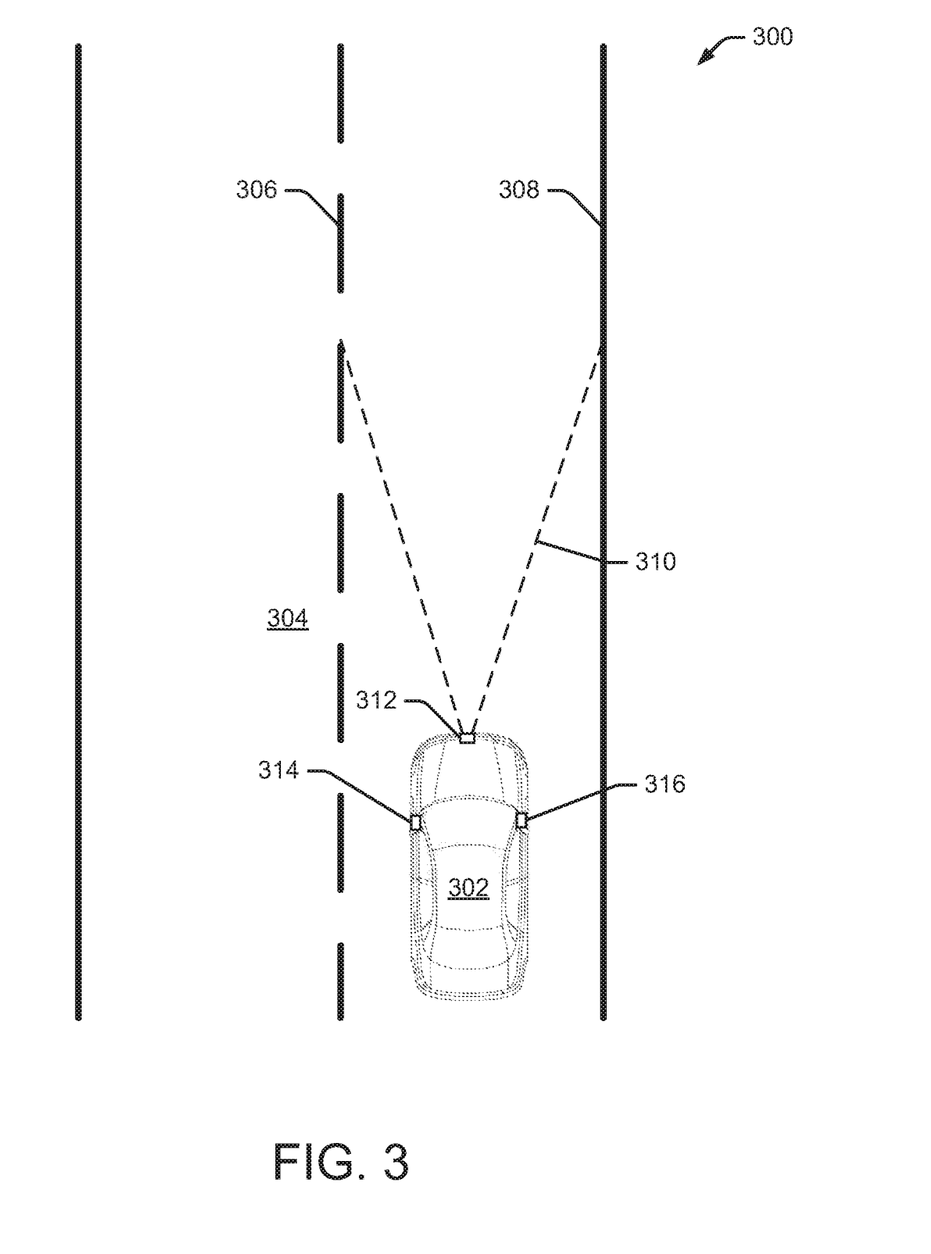
FIG. 3 illustrates an embodiment of a vehicle driving on a roadway.

FIG. 3 illustrates an embodiment 300 of a vehicle 302 driving on a roadway 304. In the example of FIG. 3, vehicle 302 has multiple vehicle-mounted cameras. In particular, vehicle 302 has a front-facing camera 312 and two side-facing cameras 314 and 316. In alternate embodiments, vehicle 302 may include any number of cameras facing in any number of different directions. As shown in FIG. 3, front-facing camera 312 captures images of the area 310 ahead of vehicle 302.

Vehicle 302 is traveling on roadway 304 in a lane defined by lane boundaries 306 and 308. Lane boundaries 306, 308 are identified by lines painted on the surface of roadway 304. In some embodiments, lane boundaries may be attached to the surface of roadway 304 using any attachment technique, such as tape, markers attached to the roadway surface, markers embedded into the roadway surface, and the like. In the example of FIG. 3, vehicle 302 is approximately centered within the lane defined by lane boundaries 306, 308.

Figure 4:
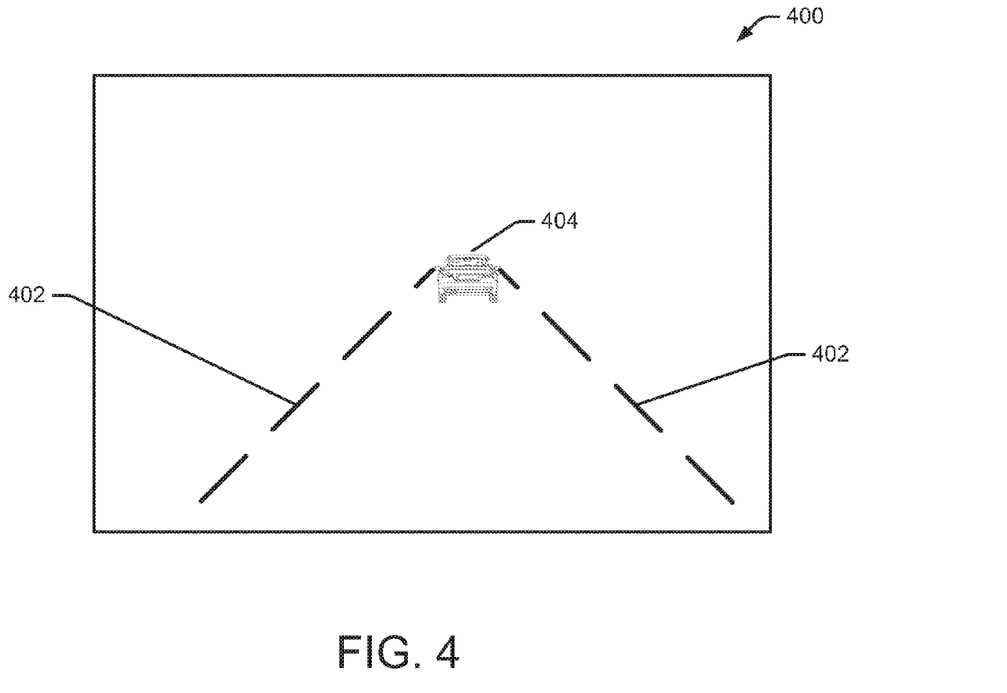
FIG. 4 illustrates an embodiment of an image representing a front-facing view from a vehicle driving on a roadway.

FIG. 4 illustrates an embodiment of an image 400 representing a front-facing view from a vehicle driving on a roadway. As shown in FIG. 4, the roadway ahead of the vehicle includes multiple lane boundary markers 402 and at least one other vehicle 404. In some embodiments, image 400 is captured by a front-facing camera mounted to the vehicle.

As described herein, some embodiments provide a system that detects lane position information using a front-facing vehicle camera. The system uses a deep neural network that is trained to estimate vehicle lane positions based on raw camera images from the front-facing camera. In some embodiments, the deep neural network is trained using example images captured, for example, from side-facing vehicle cameras. In certain implementations, a multi-layer deep neural network learns to identify lane markings and lane boundaries within images captured by vehicle-mounted cameras. In some embodiments, the deep neural network has been trained to determine a distance between the vehicle and the lane marking or lane boundary.

The system receives image data from the front-facing camera and applies geometric transformations to the front-facing camera images to create a birds-eye view of the front-facing camera scene. This birds-eye view resembles data captured from side-facing vehicle cameras, such as downward facing cameras on a vehicle's side-view mirrors. When performing the geometric transformation, the system may consider the height of the front-facing camera with respect to the ground (e.g., road surface) as well as the focal length of the camera. Additionally, when performing the geometric transformation, the system may account for the natural "lane narrowing" that occurs with front-facing images. This "lane narrowing" occurs because objects farther in the distance appear smaller. Thus, the farther portions of the roadway ahead of the vehicle appear to have narrower lanes. The system accounts for this lane narrowing when creating the birds-eye image and creates an image with lanes of substantially similar width.

The birds-eye view data is divided into multiple segments (e.g., a two-dimensional array). The system uses an existing neural network that was previously trained to detect lane positions based on data from side-facing vehicle cameras. Since the birds-eye view data is similar to the side-facing data, the existing neural network (for side-facing cameras) is applied to each of the multiple birds-eye view segments to determine lane position information associated with that segment.

In addition to determining lane position, embodiments of the system can identify specific lane markers and identify the position of the lane markers within an image or segment of an image. The described system uses the raw data from the front-facing vehicle camera and does not require any pre-processing of the front-facing camera image. Thus, the systems and methods described herein can use the raw image data from the front-facing vehicle camera to both classify the image and detect the location of lane markings in the image.

In some embodiments, a lane detection system receives an image from a front-facing vehicle camera, applies geometric transformations to the front-facing camera image to create a birds-eye view of the front-facing camera scene, divides the birds-eye view data into multiple segments, and applies a neural network previously trained using side-facing camera data to determine lane position information associated with each of the multiple segments. The number of segments can be arbitrarily coarse or fine. In some embodiments, the previously trained neural network (trained using side-view camera images) is used without any modifications.

Lane detection algorithms often operate on front-facing cameras. The systems and methods discussed herein use a neural network for lane position estimation with side-facing cameras, that look down on the road that is able to estimate the lane position. The neural network is able to directly estimate the position of the lane marker in image coordinates end-to-end —meaning that the system receives the raw camera image and the neural network output directly corresponds to the lane position without further pre- or post-processing.

Figure 5:
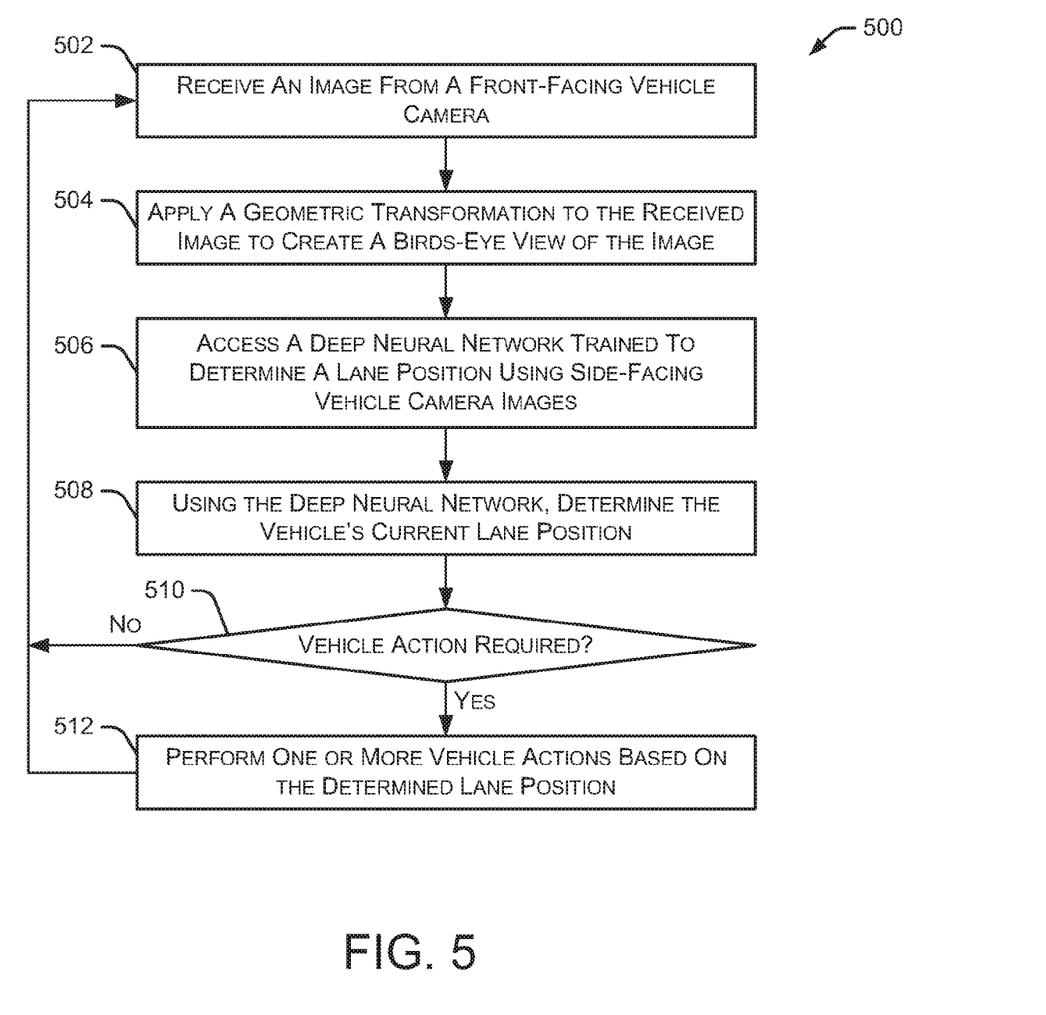
FIG. 5 illustrates an embodiment of a method for determining a vehicle's position in a lane of a roadway.

FIG. 5 illustrates an embodiment of a method 500 for determining a vehicle's position in a lane of a roadway. Initially, method 500 receives 502 an image from a front-facing vehicle camera. A geometric transformation is applied 504 to the received image to create a birds-eye view of the image. In some embodiments, this geometric transformation includes transforming the received image (received from the front-facing vehicle camera) from a first plane to a second plane. In particular implementations, method 500 uses a rotation matrix that is applied to every pixel in the original (front-facing) image to create the second (birds-eye view) image. These types of geometric transformations have an advantage that parallel lines remain constant distances from one another in the transformed (i.e., birds-eye view) image. In some embodiments, the geometric transformation is referred to as an "affine transformation." Example affine transformations represent a linear mapping method that preserves points, straight lines, and planes. Additionally, sets of parallel lines remain parallel after an affine transformation. Method 500 continues by accessing 506 a deep neural network trained to determine a lane position using side-facing vehicle camera images. Using the deep neural network, the method determines 508 the vehicle's current lane position based on the birds-eye view of the received image.

Based on the vehicle's current lane position (e.g., at a proper position in the lane or driving in an improper (or dangerous) portion of the lane, method 500 determines 510 whether some type of vehicle action is required. The vehicle action includes, for example, generating an audible, visual, or haptic warning to the driver of the vehicle to position the vehicle properly within the lane. In another example, if the vehicle is not properly positioned within the lane, the vehicle action may include instructing automated driving/assistance system 102 to automatically steer the vehicle to properly position the vehicle within the lane. If no vehicle action is required at 510, the method continues receiving new images from the vehicle's front-facing camera. If vehicle action is required at 510, the method performs 512 one or more vehicle actions based on the determined lane position and the types of actions that are approved or authorized by an operator (e.g., a driver, owner, passenger, fleet manager, and the like) of the vehicle.

Figure 6:
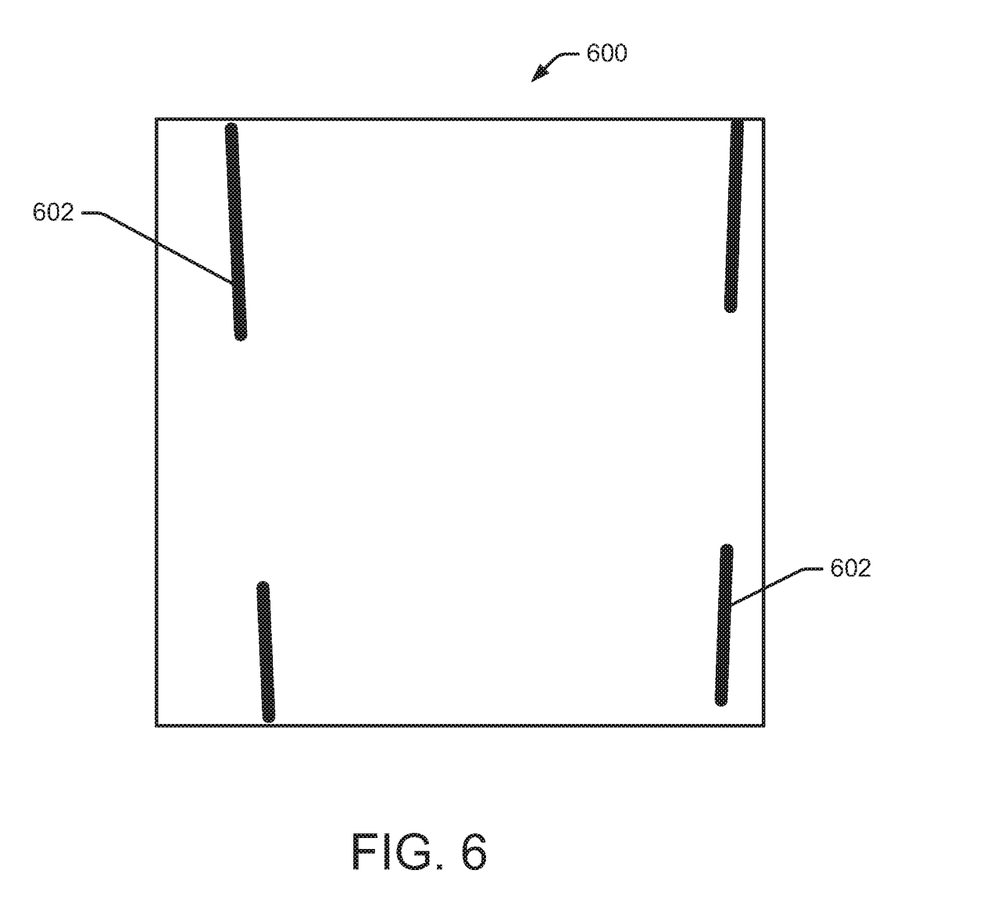
FIG. 6 illustrates an embodiment of an image representing a birds-eye view of a roadway near a vehicle.

FIG. 6 illustrates an embodiment of an image 600 representing a birds-eye view of a roadway near a vehicle. For example, image 600 may be a birds-eye view of image 400 shown in FIG. 4 after being processed by a geometric transformation procedure of the type discussed herein. Image 600 includes multiple lane boundary markers 602, which may correspond to lane boundary markers 402 in image 400.

Figure 7:
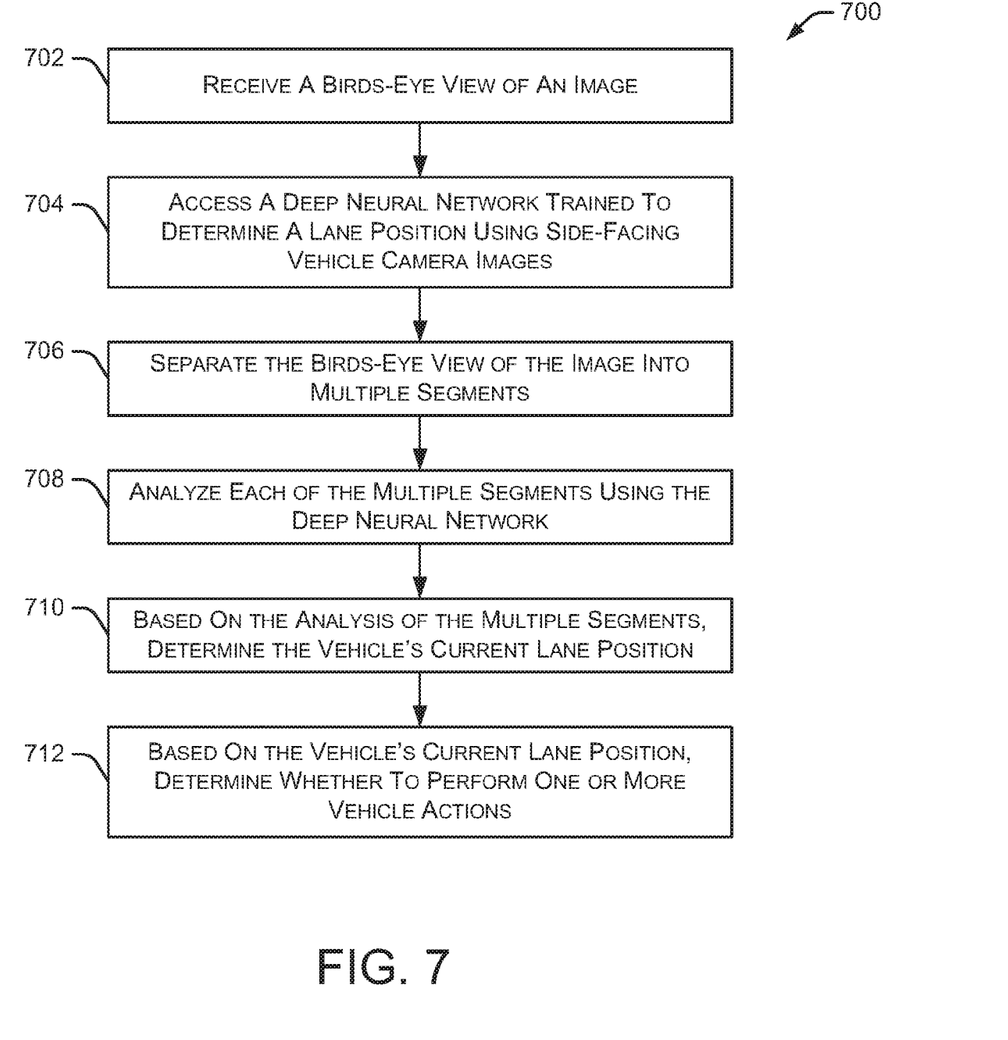
FIG. 7 illustrates an embodiment of a method for analyzing a birds-eye view image to determine a vehicle's lane position.

FIG. 7 illustrates an embodiment of a method 700 for analyzing a birds-eye view image to determine a vehicle's lane position. Initially, method 700 receives 702 a birds-eye view of an image and accesses 704 a deep neural network trained to determine a lane position using side-facing vehicle camera images. Method 700 separates 706 the birds-eye view of the image into multiple segments, such as a two-dimensional array of segments. The method analyzes 708 each of the multiple segments using the deep neural network. Based on the analysis of the multiple segments, the method determines 710 the vehicle's current lane position. Based on that lane position, method 700 determines 712 whether to perform one or more vehicle actions, such as the vehicle actions discussed above with respect to FIG. 5.

Figure 8:
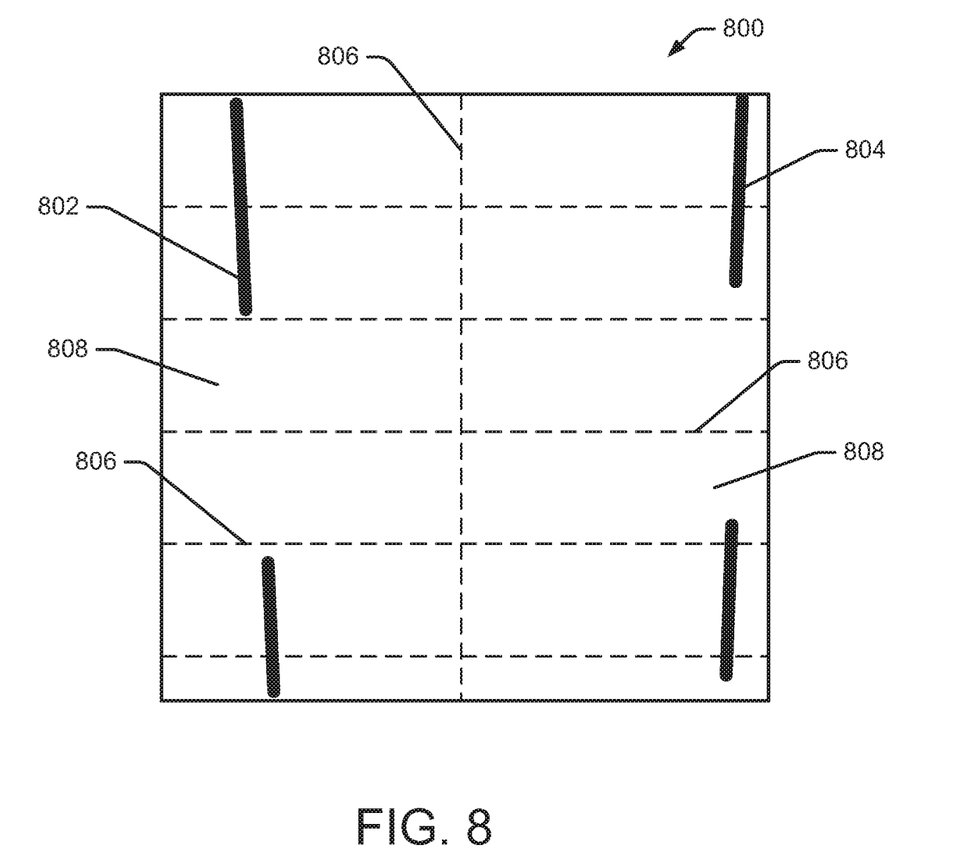
FIG. 8 illustrates an embodiment of a birds-eye view image separated into multiple segments.

FIG. 8 illustrates an embodiment of a birds-eye view image 800 separated into multiple segments 808. Image 800 includes two lane boundary markers 802 and 804 that define a driving lane on the roadway. Image 800 also includes multiple grid lines 806 that define multiple rectangular segments 808. Although FIG. 8 illustrates a two-dimensional array of rectangular segments 808, alternate embodiments may include any type of image segment having any shape and any configuration or arrangement.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving an image from a front-facing vehicle camera;
applying, using one or more processors, a geometric transformation to the image to create a birds-eye view of the image;
analyzing, using the one or more processors, the birds-eye view of the image using a neural network to obtain a lane position associated with the birds-eye view of the image, the neural network being previously trained using side-mounted and downward-facing vehicle camera images to determine a lane position associated with the side-mounted and downward-facing vehicle camera images; and
in response to the lane position associated with the birds-eye view of the image, performing, using the one or more processors, at least one of braking, steering, accelerating, and generating a driver notification.

2. The method of claim 1, wherein the geometric transformation transforms the received image from a first plane to a second plane.

3. The method of claim 1, wherein the geometric transformation transforms the received image from a vertical plane to a horizontal plane.

4. The method of claim 1, wherein the geometric transformation is an affine transformation.

5. The method of claim 1, wherein analyzing the birds-eye view of the image includes identifying at least one lane boundary marking within the birds-eye view of the image.

6. The method of claim 5, wherein identifying at least one lane boundary marking includes identifying at least one of a solid lane boundary, a broken lane boundary, and a dashed lane boundary.

7. The method of claim 1, wherein analyzing the birds-eye view of the image includes separating the birds-eye view of the image into a plurality of segments.

8. The method of claim 7, wherein analyzing the birds-eye view of the image includes analyzing each of the plurality of segments to determine a lane boundary marking within each of the plurality of segments.

9. The method of claim 8, wherein analyzing each of the plurality of segments includes using the neural network, previously trained using side-facing vehicle camera images, to identify lane boundary marking within each of the plurality of segments.

10. The method of claim 1, further comprising determining whether a vehicle action is required based on the lane position associated with the birds-eye view of the image.

11. The method of claim 10, wherein the vehicle action includes communicating a warning to the driver of the vehicle.

12. The method of claim 10, wherein the vehicle action includes activating at least one vehicle control actuator to steer the vehicle into a different lane position.

13. The method of claim 1, wherein the method is implemented in an autonomous vehicle.

14. A method comprising:
receiving an image from a front-facing vehicle camera;
applying, using one or more processors, a geometric transformation to the image to create a birds-eye view of the image;
separating the birds-eye view of the image into a plurality of segments;
analyzing, using the one or more processors, the plurality of segments using a neural network to determine a lane position associated with the birds-eye view of the image, wherein the neural network was previously trained to determine a lane position associated with images from a side-mounted and downward-facing vehicle camera; and
in response to determining the lane position associated with the birds-eye view of the image, performing, using the one or more processors, at least one of braking, steering, accelerating, and generating a driver notification.

15. The method of claim 14, wherein analyzing the plurality of segments includes determining a lane boundary marking within each of the plurality of segments.

16. The method of claim 15, wherein analyzing the plurality of segments includes determining the vehicle's position within a lane of a roadway.

17. The method of claim 16, further comprising determining whether a vehicle action is required based on the vehicle's lane position.

18. An apparatus comprising:
a front-facing camera attached to a vehicle, the front-facing camera configured to capture images representing scenes in front of the vehicle;
a geometric transformation module configured to receive an image from the front-facing camera and create a birds-eye view of the image;
an image analysis module configured to analyze the birds-eye view of the image to determine a lane position associated with the birds-eye view of the image, wherein the image analysis module uses a neural network previously trained to determine lane position using side- mounted and downward-facing vehicle camera images;
a lane position module configured to determine whether a vehicle action is required based on the lane position associated with the birds-eye view of the image; and
at least one vehicle control module confiqured to cause a vehicle control actuator to steer the vehicle into a different lane position based on the lane position associated with the birds-eye view of the image.

* * * * *

UNITED STATES PATENT AND TRADEMARK OFFICE
CERTIFICATE OF CORRECTION

PATENT NO. : 10,336,326 B2  
APPLICATION NO. : 15/362521  
DATED : July 2, 2019  
INVENTOR(S) : Alexandru Mihai Gurghian Page 1 of 1

It is certified that error appears in the above-identified patent and that said Letters Patent is hereby corrected as shown below:

Column 10, Line 31, in Claim 18:
Please change the word "confiqured" to Configured.

Signed and Sealed this  
Twenty-ninth Day of October, 2019

Andrei Iancu  
*Director of the United States Patent and Trademark Office*